(12) United States Patent
Kikkawa et al.

(10) Patent No.: US 6,788,189 B2
(45) Date of Patent: Sep. 7, 2004

(54) VEHICLE ANTITHEFT DEVICE AND PROGRAM

(75) Inventors: Hajime Kikkawa, Nagoya (JP); Masakazu Doi, Obu (JP); Tomohisa Kishigami, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/279,999

(22) Filed: Oct. 25, 2002

(65) Prior Publication Data

US 2003/0137409 A1 Jul. 24, 2003

(30) Foreign Application Priority Data

Jan. 21, 2002 (JP) ........................................ 2002-011435

(51) Int. Cl.⁷ .............................................. B60R 25/10
(52) U.S. Cl. ............................. 340/426.1; 340/426.11; 340/426.18; 307/10.2
(58) Field of Search ........................ 340/426.1, 426.11, 340/426.18, 506, 10.1; 307/10.2

(56) References Cited

U.S. PATENT DOCUMENTS

| | | | | |
|---|---|---|---|---|
| 5,006,843 A | * | 4/1991 | Hauer | 340/5.28 |
| 5,554,891 A | * | 9/1996 | Shimizu et al. | 307/10.2 |
| 5,815,087 A | * | 9/1998 | Campbell et al. | 340/5.6 |
| 5,982,894 A | * | 11/1999 | McCalley et al. | 340/5.21 |
| 6,150,923 A | * | 11/2000 | Johnson et al. | 340/384.6 |
| 6,608,553 B2 | * | 8/2003 | Isobe | 340/426.1 |

FOREIGN PATENT DOCUMENTS

| | | |
|---|---|---|
| JP | A-H09-240431 | 9/1997 |
| JP | A-H11-182389 | 7/1999 |
| JP | B2-3137443 | 12/2000 |
| JP | A-2001-14575 | 1/2001 |

* cited by examiner

Primary Examiner—Toan N. Pham
(74) Attorney, Agent, or Firm—Posz & Bethards, PLC (57) ABSTRACT

Code verification is executed with a surveillance target such as an engine ECU or an immobility ECU installed in a vehicle. Failure of the verification indicates that the corresponding ECU may have been replaced. No reply to the verification indicates that the corresponding ECU may have been removed. The failure or no reply causes bus interference through a bus interference generator. Specifically, the bus interference generator generates to circulate, over the bus, a signal interfering with a signal from the ECUs connected with a local area network to disable a plurality of driver/receiver ICs. This interference with the ECUs results in ceasing normal operations and reducing product value of the vehicle.

22 Claims, 5 Drawing Sheets

VEHICLE ANTITHEFT DEVICE AND PROGRAM

CROSS REFERENCES TO RELATED APPLICATIONS

This application is based on and incorporates herein by reference Japanese Patent application No. 2002-11435 filed on Jan. 21, 2002.

BACKGROUND OF THE INVENTION

The present invention relates to a vehicle antitheft technology.

As a vehicle antitheft measure, an immobilizer has been adopted to verify a unique ID code. The immobilizer is an antitheft technology of disabling an engine from starting unless a predetermined condition is satisfied. However, an instrument holding the immobilizer is sometimes illicitly replaced so that the vehicle is stolen for an illegal purpose. JP-A-H11-182389 discloses, as a countermeasure, that an engine control unit disables an engine start by determining replacement of a remote engine starter. Combination of other instruments or multiplex communication with the immobilizer enhances antitheft performance. In JP-B2-P3137443, a plurality of control units composes antitheft guard structure through multiplex communication, which thus realizes a large-scale alarm system.

Additionally, in JP-A-P2001-14575A, detection of vehicle abnormality leads to informing a driver of the effect and also detection of an unauthorized operation against the vehicle leads to deterring or ceasing a vehicle control function by a remote operation.

However, even if the above countermeasures are adopted, unauthorized replacement of a control unit or replacement to a remodeled unit disabling the immobilizer permits the vehicle to recover inherent performance. Even an authorized user is thereby able to operate the vehicle as usual. Moreover, when the vehicle is conveyed by a wrecker capable of generating radio noise or shielding radio wave, the alarm system to the outside of the vehicle is intercepted. After the steal, removal or remodeling of the control unit can break down the alarm system of the stolen vehicle. The stolen vehicle is thus used illicitly while maintaining the inherent vehicle function.

Altogether, the conventional antitheft measures turn out to be useless with the replacement of the immobilizer itself or the engine control unit detecting the replacement of the immobilizer. The alarm system to the outside of the vehicle or the remote operation instrument is also become ineffective by interruption of the alarm transmission or the replacement of the instrument itself.

SUMMARY OF THE INVENTION

It is therefore an object of the present invention to provide an effective vehicle antitheft technology.

To achieve the object, all or part of performance of a network system is disabled or reduced by determining a hazard state where a vehicle theft possibly arises. This approach is very different from a conventional antitheft measure which mainly focuses on an alarm or prevention of the steal such as an alarm to the outside of the vehicle or disabling of an engine start. The invention concentrates on reducing vehicle performance when a stealer tries to disable the antitheft measure or the theft alarm, which approach dispirits the stealer's mind aiming at the vehicle steal. Here, the vehicle is assumed to be provided with an in-vehicle network system where a plurality of electronic control units is connected with the network. A luxury car is typically equipped with a massive and complicated structure of the network while the luxury car is in many cases aimed at by the stealer. In the network system, data among electronic control units are frequently communicated so that disabling or reducing of all or part of the network system results in extreme reduction of the vehicle performance.

In another embodiment of the invention, vehicle performance remains disabled or reduced as a default state until verification of the user is successfully completed through a predetermined process. This approach is effective in preventing the vehicle steal from occurring.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
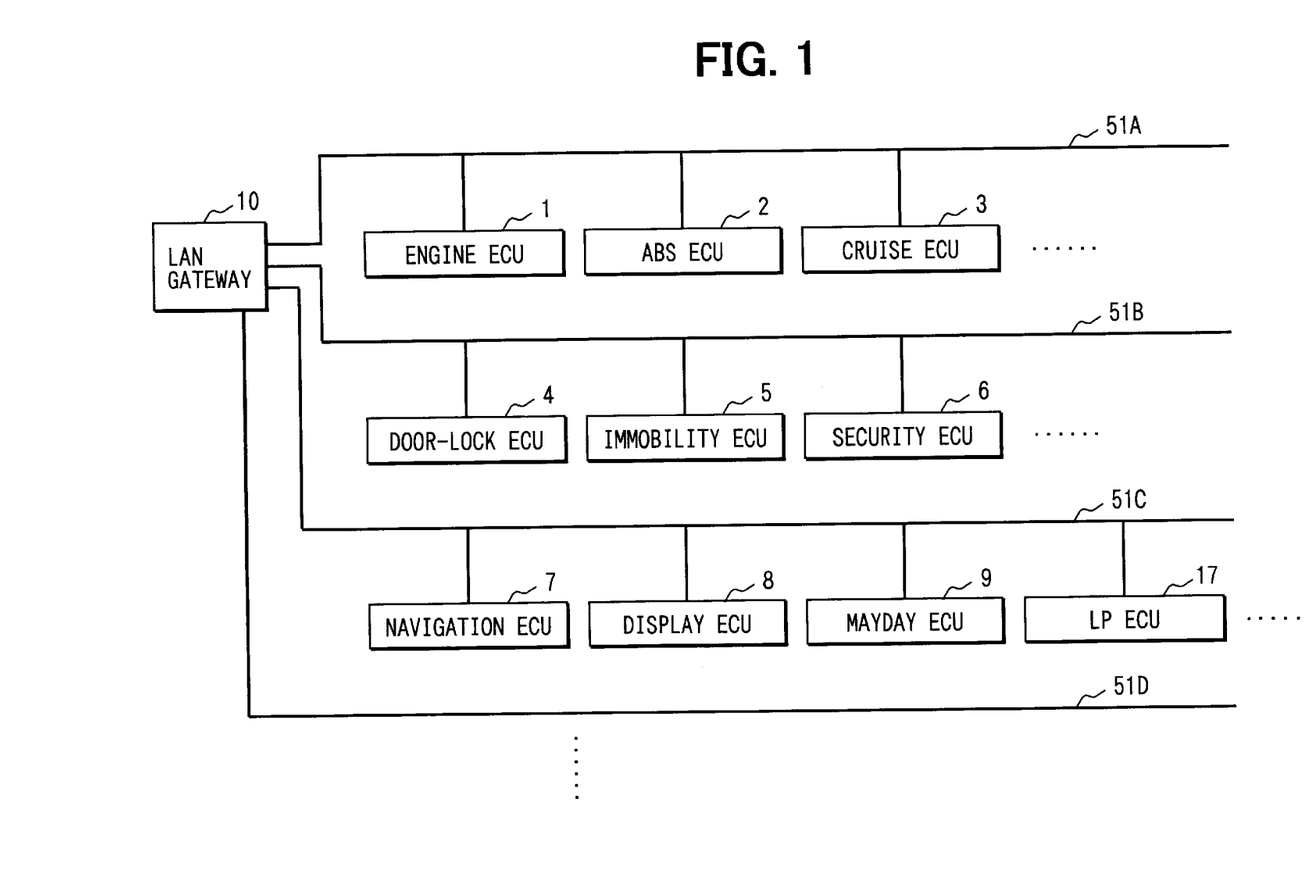
FIG. 1 is a block diagram of an in-vehicle network system according to an embodiment of the present invention.

Referring to FIG. 1, an in-vehicle network system of an embodiment of the present invention includes ECUs (electronic control units), LANs (local area networks) and a gateway unit 10. The ECUs are as follows: an engine ECU 1; an anti-lock brake system (ABS) ECU 2; a cruise ECU 3; a door-lock ECU 4; an immobility ECU 5; a security ECU 6; a navigation ECU 7; a display ECU 8; a mayday ECU 9; a LP (license plate) ECU 17; and other ECUs (not shown). The LANs are as follows: a LAN communication line 51A connecting the ECUs 1–3, a LAN communication line 51B connecting the ECUs 4–6, a LAN communication line 51C connecting the ECUs 7–9 and 17, a LAN communication line 51D connecting other ECUs, and others (not shown). The gateway unit 10 is to mediate diverse protocols and data communication among the LAN communication lines.

The engine ECU 1 is to control an engine. The ABS ECU 2 is a slip control unit during the braking. It controls a brake actuator operating a control valve for reducing and increasing by changing duties of the control valve. The valve is provided in brake oil circuit for regulating a brake force. The cruise ECU 3 is a driving control unit to execute a cruise control. It maintains a safe distance from a vehicle ahead, and it maintains a constant speed when there is no vehicle ahead. These three ECUs 1, 2 and 3 are relating to vehicle movement.

The door-lock ECU 4 is to control a lock/unlock of the door and provided with a keyless entry function in the embodiment. It receives and demodulates a radio wave transmitted from an electronic key held by a user to determine whether the radio wave is sent from the electronic key for the keyless entry. It controls the lock/unlock of the door according to an obtained command after the affirmative determination.

Figure 2:
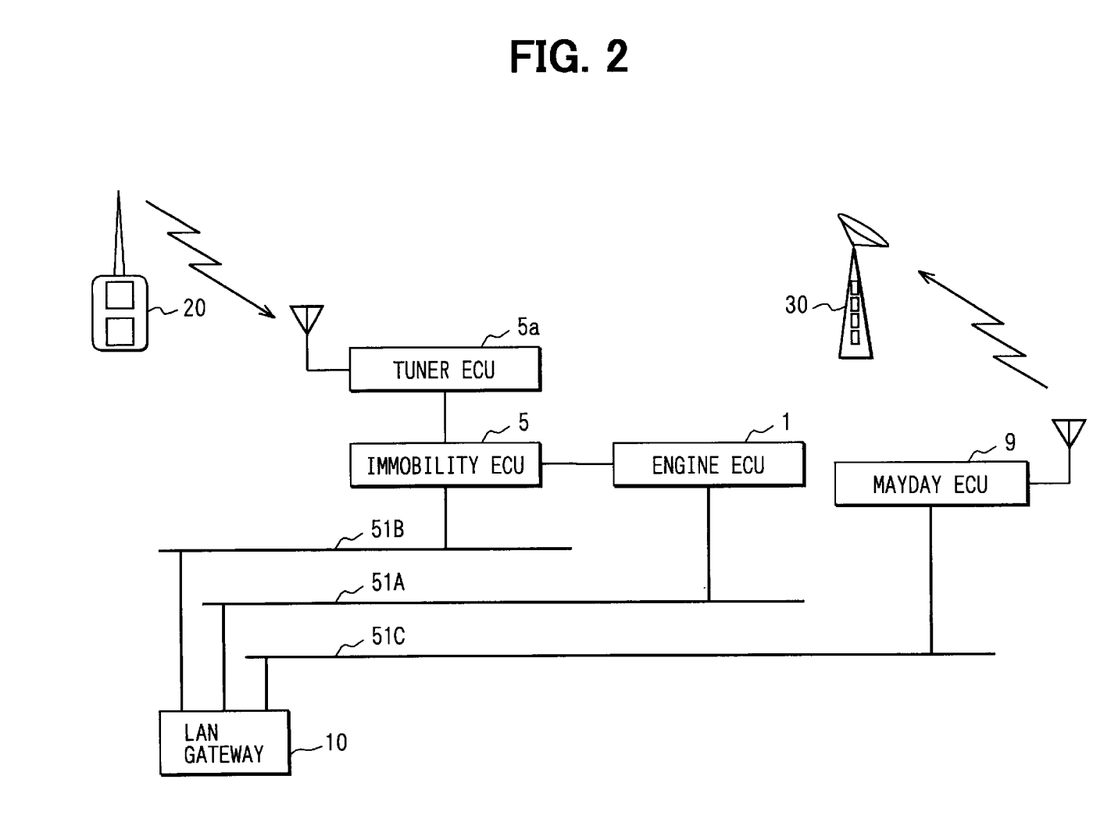
FIG. 2 is an explanatory diagram of an immobility ECU and a mayday ECU according to the embodiment.

The immobility ECU 5 connected with a tuner ECU 5A, as shown in FIG. 2, receives and demodulates a radio wave sent from an electronic key 20 held by a user to obtain an ID code. It then verifies the ID code to permit the engine ECU 1 to start the engine.

The security ECU 6 detects an unauthorized operation against the vehicle, then notifying the effect to surrounding areas. It inputs signals of various sensors and switches such as an intrusion sensor and courtesy switches. Based on the signals, it notifies the unauthorized operation to the outside of the vehicle by activating alarm system such as horn (not shown) and lighting and blinking of lamps (not shown).

The navigation ECU 7 is to control navigation system connecting with a GPS (global positioning system) receiver (not shown) that detects a vehicle position. The display ECU 8 is to control displaying for display devices.

The mayday (emergency call service) ECU 9 is equipped with the GPS receiver, an image-scanning unit scanning surroundings of the vehicle, and a data communication unit (not shown) communicating by wireless with an emergency station 30. It responds to a state detected by the security ECU 6 or sends to the emergency station 30 various kinds of the information such as the images around the vehicle or the vehicle position. In addition, the LP ECU 17 is to detect unauthorized removal of a license plate.

Figure 3:
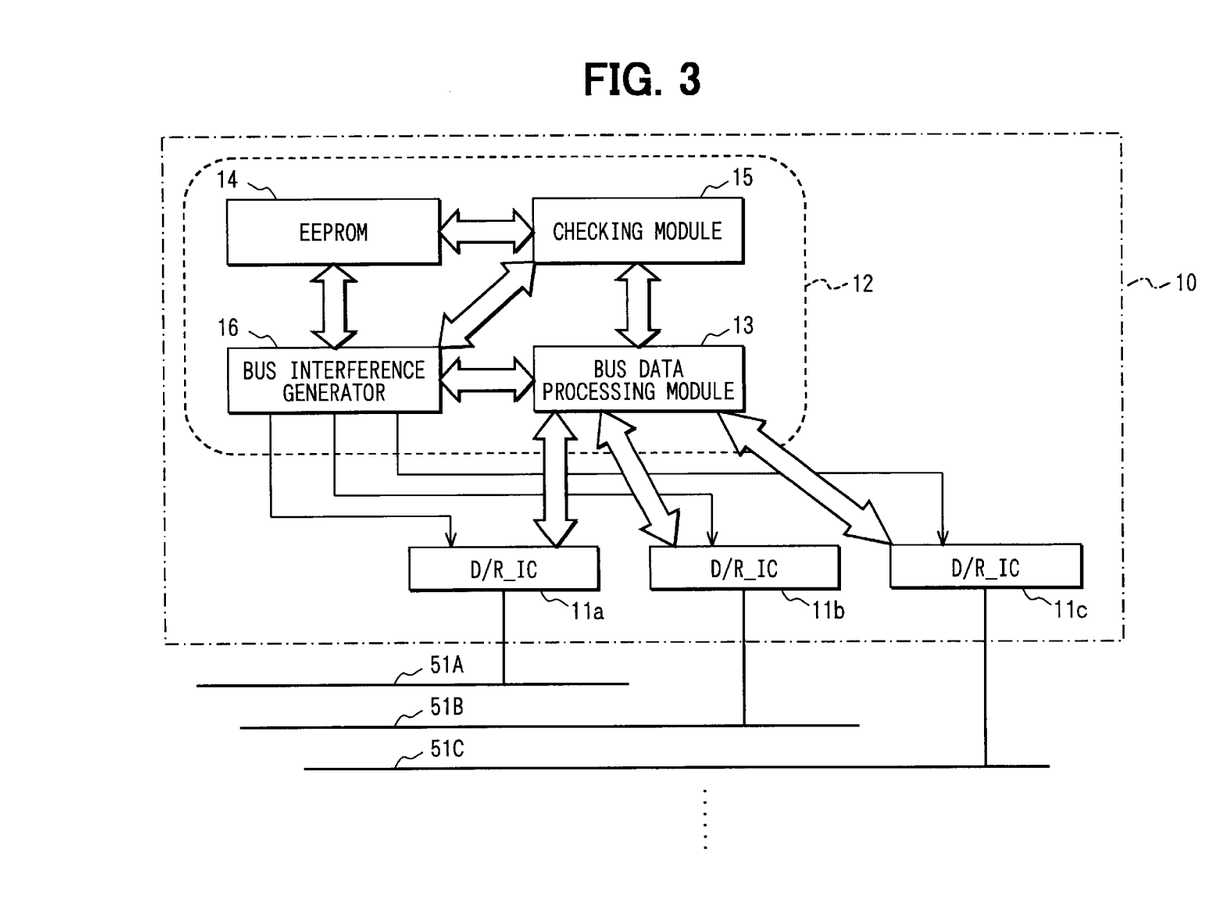
FIG. 3 is an explanatory diagram of a gateway unit according to the embodiment.

The gateway unit 10, as shown in FIG. 3, is equipped with a microcomputer 12 and driver/receiver ICs 11A, 11B and 11C connected with the corresponding LAN communication lines 51A, 51B and 51C. The microcomputer 12 is provided with a bus data processing module 13, an EEPROM (electrically erasable programmable read-only memory) 14, a code checking module 15 and a bus interference generator 16. Here, the bus data processing module 13 is connected with the driver/receiver ICs 11A, 11B and 11C. The EEPROM 14 stores an ID (identification) code for the verification with predetermined ECUs. The code checking module 15 verifies the ID code of the predetermined ECU with the corresponding reference ID code stored in the EEPROM 14. The ID code of the predetermined ECU is obtained through the bus data processing module 13. The bus interference generator 16 sends out interfering signals to the driver/receiver ICs 11A, 11B and 11C. The generator 16 is connected with the bus data processing module 13, the EEPROM 14 and the code checking module 15.

The bus interference generator 16 disables the driver/receiver ICs 11A, 11B and 11C. It generates and circulates, over the bus, the signals interfering with signals from the ECUs connected with the LAN communication lines 51A, 51B and 51C, for instance, by fixing a potential at a high level or switching over high→low→high→low.

In the above in-vehicle network system of the embodiment, the immobility ECU 5 normally prevents unauthorized users from starting the engine. The reason is that the immobility ECU 5 never permits the engine ECU 1 to start without successful verification of the ID code from the electronic key 20 held by the user. However, unauthorized replacement of the immobility ECU 5 itself or to the remodeled ECU disabling the immobilizer function enables the vehicle to perform the inherent functions without the electronic key 20.

The mayday ECU 9 also normally informs, when a vehicle is stolen, the vehicle position to the emergency station 30 which is enabled to chase the stolen vehicle through the informed vehicle position. However, when the vehicle is conveyed by a towing truck capable of generating radio noise or shielding a radio wave, the informing system to the outside of the vehicle is intercepted. After the steal, removal or remodeling of the mayday ECU 9 may disable the informing system of the stolen vehicle.

Even if the immobilizer or the emergency alarm functions are installed, the stealer thus devises some kinds of methods for disabling the functions. Accordingly, the in-vehicle network system of the embodiment adopts a countermeasure of reducing the product value of the vehicle, which approach is different from a conventional one. This countermeasure dispirits the stealer who plans to execute disabling the antitheft or alarming system such as the replacement or removal of the engine ECU 1 or the immobility ECU 5.

Figure 4:
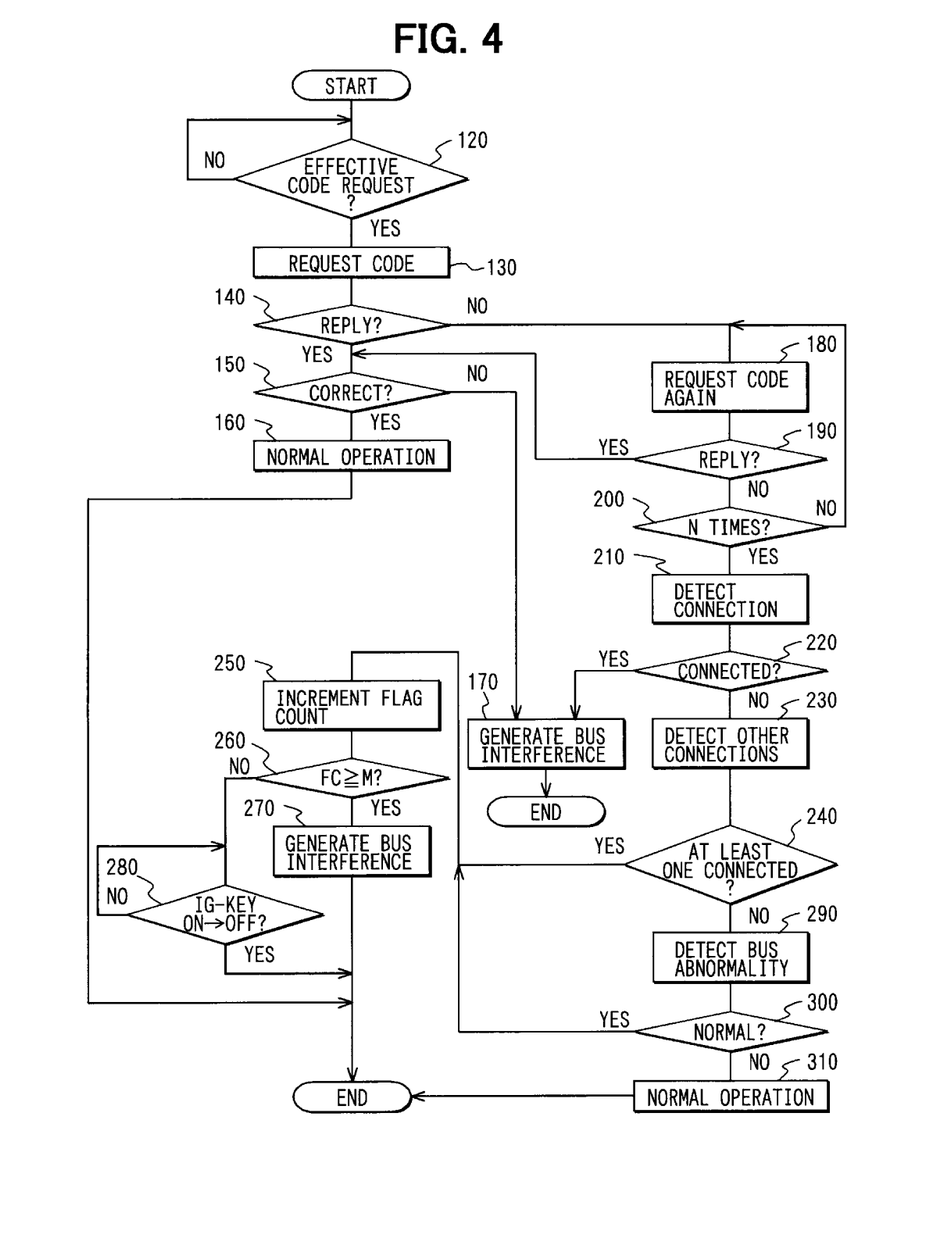
FIG. 4 is a flow diagram of procedures in the gateway unit according to the embodiment.

Referring to FIG. 4, the procedures of the countermeasure is explained. The flow diagram shows the process executed by the microcomputer 12 in the gateway unit 10 when the gateway unit 10 and each ECU are powered with an ignition switch being turned on.

With starting of a verification routine, effectiveness of code request condition is determined first at step 120. The affirmation of the step 120 leads to transmission of the code request commands to the ECUs of surveillance targets at step 130. The target ECUs include the engine ECU 1 and the immobility ECU 5. Presence of the reply from the ECUs is determined at step 140. If received, YES at step 140, the code verification is executed at step 150; namely the codes obtained from the ECUs are verified with the reference stored in the gateway unit 10. If the verification succeeds (YES at step 150), a normal operation proceeds at step 160.

Contrarily failure of the verification (NO at step 150) leads to generation of the bus interference through the bus interference generator 16 at step 170. Here, the failure of the verification implies the replacement of the original ECU to a different ECU since the code sent from the corresponding ECU is different from the reference stored in the gateway unit 10. The bus interference generator 16 sends out the interfering signal to the driver/receiver ICs 11A, 11B and 11C. The interference with the signals from the ECUs, connected with the LAN communication lines 51A, 51B and 51C, prevents the normal operation. This results in reduction of the product value of the vehicle.

At step 140 the negative determination, no reply from the corresponding ECU, leads to a retry of sending the code request at step 180. If the ECU replies, the procedure shifts to step 150. If the ECU does not reply, the code request is retried at step 180 until the number of retried request times exceeds N. The number of the retries is determined at step 200. Here, N is an integral number of not less than one. The retry of the request enables the reply to be obtained even when temporary disconnection occurs due to noise. The retry prevents the incorrect determination. When the retry number exceeds N times (YES at step 200), connection with the corresponding ECU is checked at step 210. The connection is determined, for instance, by the following cases: When a code-sending frame is to be sent at periodic intervals, the frame is, in many cases, not received for more than a predetermined period; or when other periodic-interval frame is sent from the target ECU unit, the frame is, in many cases, not received for more than a predetermined period.

When the connection is determined (YES at step 220), the bus interference is generated at step 170. Here, no reply for the code request, even with the connection, implies the possibility of the replacement of the ECU so that the normal operation is disabled by generating the bus interference.

On the contrary when the disconnection is determined (NO at step 220), the connections of other ECUs connected with the same bus are checked at step 230 and whether at least one ECU is normally connected is determined at step 240. The affirmative determination at step 240 means that at least one ECU is normally connected and communicated with the same LAN communication line, which leads to incrementing a warning flag count FC at step 250. When the warning flag count FC then exceeds M (YES at step 260), the bus interference is generated at step 270. When the flag count FC remains less than M (NO at step 260), a change of on/off of an ignition key is determined at step 280. When the ignition key is turned off, the procedure ends and returns to the start of the verification routine.

On the other hand, negative determination at step 240 means normal communication with all the ECUs is impossible, which leads to checking of the bus abnormality step 290. The determination of the bus abnormality is explained later. The bus normality (YES at step 300) leads to step 250, and the bus abnormality (NO at step 300) leads to a normal operation step 310.

An overall flow chart is explained in the above. Additional explanations are described as follows.

(1) The bus interference generation at step 170 is performed in the following cases: Owing to the unauthorized replacement of the target ECU, the ECU possesses the code being inconsistent with the reference code stored in the gateway unit 10 or no ID code, or the ECU is incapable of answering to the code request. In contrast, the bus interference generation at step 270 is performed on the assumption that the target ECU is disconnected. Through some kinds of bus abnormality (for instance, bus short or bus open near the response unit) there is no reply from the target ECU which should respond. Permanent continuity of this disconnection leads to the bus interference generation at step 270. Here, an immediate shift to "bus interference generation" is avoided; the shift is executed when the warning flag reaches not less than M times as described above. The reason is that the abnormal state of the communication bus in the vehicle may arise from some kinds of malfunction without any unauthorized operation. The predetermined number M used in the determination at step 260 should therefore be set properly with considering the above.

The procedure proceeds to step 270 through step 250 by affirmative determination at step 240. Here, the target ECU is disconnected while the communication is established with at least one of the other ECUs connected with the same LAN communication line. Therefore the target ECU is probably removed.

The normal operation continues at step 310 when the corresponding LAN communication line is not communicative (NO at step 240) and also the bus abnormality is determined (NO at step 300). The reason is that the performance as the vehicle is insufficient with failure of the certain LAN communication line. For instance, even when the target ECU is incorrectly removed, the vehicle function has been already insufficient due to no materialization of a relay processing or control of the unit.

(2) The approaches of checking the bus abnormality at step 290 depends upon a protocol but general ones are as follows.

(i) Bus short circuit on GND:

The GND short is determined when, the first bit (usually a potential bit opposite to the non-communication state of the bus) cannot be established for a long time as potential with the gateway unit 10 starting communication. The target ECU, capable of observing the bit state simultaneously with transmitting, considers detection that the first bit is not changed as the GND short circuit.

(ii) Bus short circuit on +B (high potential in 5 or 12 voltage of the in-vehicle battery):

The ECU does not start to transmit while another ECU is transmitting, finding out the transmission start timing according to rules. One of the rules is that a frame is not transmitted to the bus for a predetermined period. The gateway unit 10 therefore considers the continuity of the above state as an abnormal state (+B short circuit) where the bus is occupied by other signals.

(iii) Bus open:

Even in other than the above cases, no reception of the signal from other ECUs is considered as the bus open. When receivable ECUs are limited, the bus is normally connected with the receivable ECUs and is, by contrast, open in the region behind the receivable ECUs.

Furthermore, when a circuit, capable of detecting bus potential through an A/D input, is installed, the short circuit is correctly detected.

(3) The process shown in FIG. 4 is executed while the gateway unit 10 and each ECU are powered with the ignition switch turning on. It is assumed that the engine ECU 1 is powered only by turning on of the ignition switch and also that the engine ECU 1 is included in the target ECUs. However, this assumption may be changed by which ECU is designated as the target ECU. The gateway unit 10 and the immobility ECU 5 are communicative regardless of ON/OFF of the ignition switch, while the engine ECU 1 is typically communicative only with the ignition switch turning on. When the target ECUs only include the ECUs, which are communicative regardless of ON/OFF of the ignition switch, such as the immobility ECU 5, the process shown in FIG. 4 is therefore executable regardless of ON/OFF of the ignition switch.

(4) The code request is sent at step 130. If the request is sent at a periodic interval, an unauthorized tool may answer a false signal. An event driven program for request/reply should be therefore adopted.

Furthermore, even with changing the timing, the false reply may be answered so that additional functions may be adopted as a measure by the following: shifting the code to a rolling code comparable to an immobility code; and a code memorized by each other is to be changed as needed using a cipher.

(5) Determining step "ignition key on→off" is included at step 280. This is used as information corresponding or relating to frequency of user's driving chances. The user may recognize the vehicle inoperability during the driving chances. For instance, a luxury vehicle up-to-date is equipped with voice guidance or with a meter panel or a display showing warning or information with lighting/blinking of a warning lamp or sounding of a buzzer when the bus abnormality arises. Routing assistance to the nearby car service dealer is also available in some kinds of the vehicles, which notifies the user of the abnormality.

As explained above, the measure of disabling or reducing all or part of the vehicle performance is executed in the in-vehicle network system of the embodiment. When the target ECU such as the engine ECU 1 or the immobility ECU 5 is incorrectly replaced or removed, the gateway unit 10 generates the bus interference to execute the measure. The adoption of the measure reducing the product value of the vehicle then is disclosed to be recognized by the potential stealer. He thereby thinks that stealing is meaningless, which results in preventing the steal of the vehicle.

Figure 5:
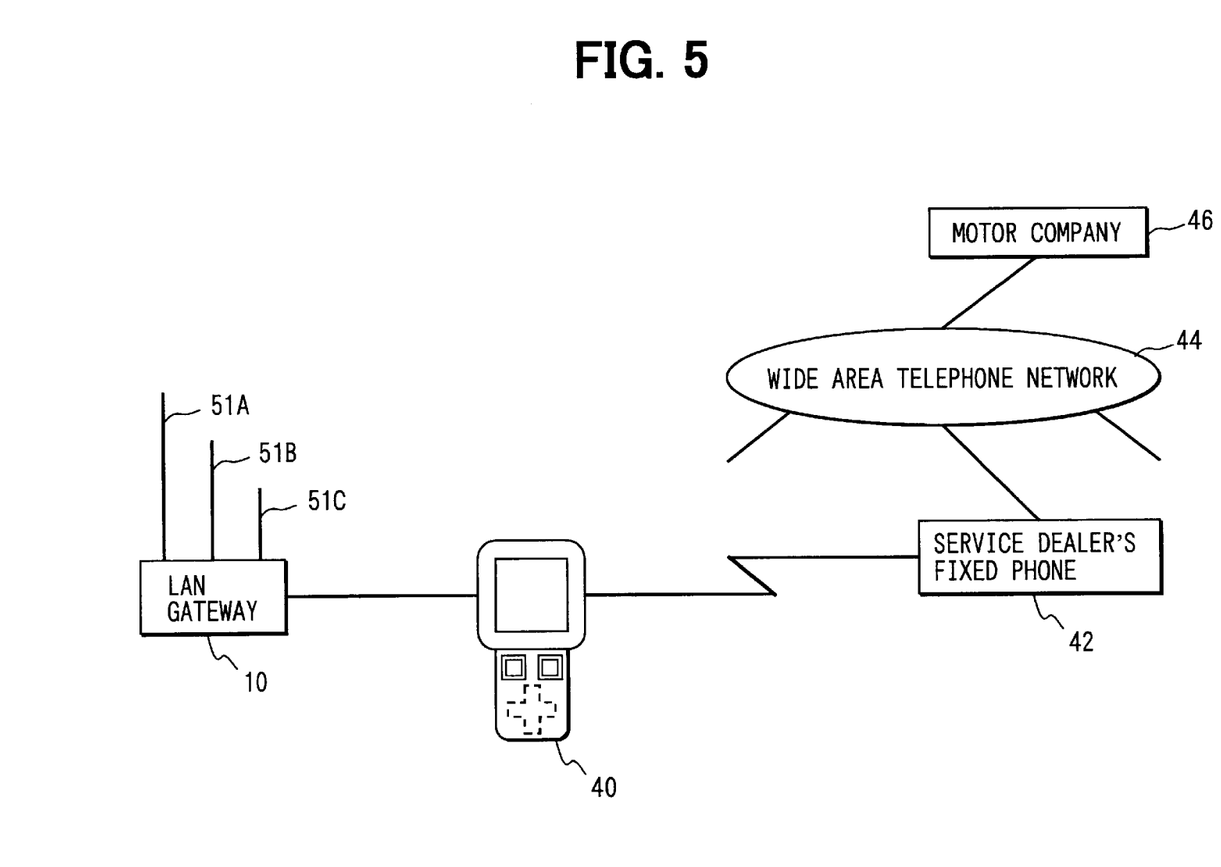
FIG. 5 is an explanatory diagram of a guard release according to the embodiment.

Here, since all or part of the performance in the network system are disabled or reduced, a guard release (process for recovering to the normal state) is necessary for the normal user to drive again as usual. Referring to FIG. 5, the guard release is explained.

In the embodiment, the recovery is executed for instance in a repair shop of a car service dealer. For the guard release a service tool 40 is connected with the gateway unit 10 which is provided with a connecter connectable with the service tool 40. The service tool 40 is capable of data communication with a station 46 in a motor company or another through a wide area telephone network 44 from a fixed phone 42 (or extension) of the dealer. The station 46 is located separately from the repair shop of the dealer. Data in a memory unit (not shown) of the station 46 include access information with which the service tool 40 accesses the gateway unit 10, guard release information, and data base with which the validity of the service tool 40 is verified.

Calling out the station 6 from the service tool 40 enables data communication with each other through a predetermined protocol. The station 46 confirms a correct access through the number informed by the dealer's fixed phone so that it does not reply to the information request from an unauthorized access source. With the correct access, the guard release information is sent out. The service tool 40 thus executes the guard release.

The above embodiment may be modified as follows.

(1) In the above embodiment, the gateway unit 10 takes a role of the bus interference though other ECUs can also take the role. The reason is that a luxury vehicle being subject to a steal target is often equipped with a massive network system where the gateway unit 10 typically mediates the data communication among a plurality of the LAN communication lines. Here, the bus interference generated by the gateway unit 10 leads to effective disabling or reducing of the vehicle performance and results in increasing the antitheft effect.

When the gateway 10 only takes the bus interference role of knocking down the entire network system, the unauthorized replacement of the gateway unit 10 itself erases the antitheft effect. The bus interference should therefore be installed in at least one ECU (or all ECUs) in addition to the gateway unit 10 to completely knock down the bus though costs are increased.

As the bus interference source, another unit other than the ECUs may be separately prepared. In short, the bus interference function is not subordinately included to the gateway unit or the engine ECU but dedicated to a unit connected with the LAN communication lines. Even if the gateway unit 10 or each of the ECUs is replaced, the bus interference function still remains in the vehicle.

(2) In the above embodiment, a trigger of bus interference generation is no reply from target ECUs or failed verification between the gateway unit 10 and each target ECU supposing the target ECUs include the engine ECU 1, the immobility ECU 5 and the security ECU 6. Other triggers, that determine the state where occurrence of the vehicle theft is possible, include followings.

(i) A vehicle position difference between a prior position before turning off powering and a present position after resuming powering: The navigation ECU 7 or the mayday ECU 9 is capable of notifying a vehicle-existing position to the gateway unit 10. When the gateway unit 10 detects the position difference or receives no reply of the position, the bus interference may be generated. When the navigation system itself malfunctioned, the bus interference is not generated by recognizing the malfunction during the operation. After the vehicle is stolen, the navigation system or telematics system both of which has a function of notifying a stolen position may be illicitly replaced. Here, the gateway unit 10 thereby generates the bus interference to disable the vehicle performance.

(ii) A vehicle license plate removal: Here, transmitted information of the removal of the license plate from the LP ECU 17, as shown in FIG. 1, may be a trigger for the bus interference.

(iii) An alarm security warning: The bus interference function is valid or invalid according to a warning period or no warning period of the alarm system, respectively. Here, a security function should be considered that it remains effective even when a LAN function is disabled. For instance, a sensor or an actuator should be directly connected with the security ECU 6 without passing through the LAN communication line so that the security function remains executable even with the disabled LAN communication line.

(3) In the above embodiment, the bus interference is generated by a software approach instead of a hardware approach. The bus interference generator 16 disables driver/receiver ICs 11A, 11B and 11C by circulating over the bus the signal interfering signals from ECUs connected with LAN communication lines for instance by fixing potential at a high level or switching over high→low→high→low.

In contrast, the hardware approach may be adopted. The bus interference source may be provided in a circuit, whose remodeling is difficult from the outside, such as an internal circuit or printed circuit board installed in the driver/receiver ICs 11A, 11B and 11C. Here, the circuit generates the bus interference including shot-circuiting GND, short-circuiting at high potential and retaining at intermediate potential, which results in disabling the entire ECUs connectable with the LAN communication lines.

When a communication bus (LAN communication line) is in the form of twisted pair communication lines, short-circuiting of each party of the twisted pair may lead to disabling the communication function. In the twisted pair, the short-circuiting of only one party may not be effective by back-up communication so that both parties of the pair should be short-circuited. This approach upgrades the effectiveness of disabling the communication performance. Here, the short-circuiting of each party of the twisted pair includes bridging the two parties of the twisted pair.

(4) In the above embodiment, though disabling/reducing the vehicle performance is executed when a vehicle steal is assumed to occur, it may be executed, in contrast, for preventing the vehicle steal itself from occurring. Here, all or part of the performance is disabled or reduced as a default state until authentication is successfully completed through a predetermined authentication procedure. Only with the successful authentication through the predetermined procedure, the performance of the network communication is recovered to a normal state. For instance, the immobility ECU 5 executes a user authentication with an electronic key 20 using code verification or a biometric verification such as a fingerprint. The successful authentication only then leads to the normal communication performance of the vehicle.

Furthermore, after the above recovery of the vehicle performance due to the successful verification, the approach of disabling/reducing the vehicle performance may be added when the vehicle steal is assumed to occur as described in the above embodiment. This produces the integrated effect of the antitheft measure.

The function of disabling or reducing the vehicle performance as a vehicle antitheft measure described above may be materialized by using a program activated by a computer system. The program may be stored in a memory readable in the computer, such as a flexible disk, an optical magnetic disk, a CD-ROM, a hard disk drive, ROM, RAM and others. Here, the program is loaded into the computer system as needed to be activated to execute. Also program may be loaded into the computer system through a network.

What is claimed is:

1. A vehicle antitheft device installed in a vehicle provided with a network system including a gateway, a plurality of local area networks, and a plurality of electronic control units coupled through a network, wherein the gateway mediates data communication according to diverse protocols among the plurality of local area networks, and wherein each of the plurality of local area networks is connected with at least one of the electronic control units, the device comprising:

first means for determining a hazard state, where vehicle theft possibly arises, including one of an unauthorized replacement and a removal of at least one electronic control unit; and second means for at least partially disabling the network system by interfering with the data communication upon determining the hazard states, wherein the first means and the second means are included in the gateway.

2. A vehicle antitheft device as recited in claim 1, wherein at least one of the plurality of electronic control units requires control related information transferred through the network, and wherein the first means at least partially disables the network system as to the at least one of the plurality of electronic control units.

3. A vehicle antitheft device as recited in claim 1, wherein the first means further at least partially disables the network system by interfering with the data communication by short-circuiting a communication bus connected with the network system.

4. A vehicle antitheft device as recited in claim 3, wherein the communication bus is in the form of twisted-pair communication lines, and wherein the communication functions are disabled by short-circuiting each party of the twisted-pair.

5. A vehicle antitheft device as recited in claim 4, wherein the short-circuiting of each party of the twisted-pair is executed by bridging each other of the twisted-pair.

6. A vehicle antitheft device as recited in claim 1, wherein the first means further at least partially disables the network system by interfering with the functions associated with the data communication between the plurality of local area networks mediated by the gateway.

7. A vehicle antitheft device as recited in claim 1, wherein the first means at least partially disables the network system by circulating over the network a signal interfering with signals sent from the plurality of the electronic control units.

8. A vehicle antitheft device as recited in claim 1, further comprising:

third means for authenticating at least one of the plurality of electronic control units through an authentication process; and fourth means for initially at least partially disabling the network system until the authentication process is successfully completed, and for returning the network system from an at least partially disabled state to a normal state after the authentication process is successfully completed.

9. A vehicle antitheft device as recited in claim 8, wherein the third means and the fourth means are included in the gateway.

10. A vehicle antitheft device installed in a vehicle provided with a network system combining a plurality of electronic control units through a network, the device comprising:

first means for determining a hazard state associated with a vehicle theft possibly, the hazard state including one or more of a removal of at least one of the plurality of electronic control units, an unauthorized replacement of the at least one of the plurality of electronic control units, and an unauthorized manipulation of the vehicle; and second means for at least partially disabling a function of the network system upon determining the hazard state, wherein at least one of the plurality of electronic control units is provided with vehicle-information transmitting means which transmits, by wireless, vehicle information including a vehicle state and a vehicle position to an external information station when the hazard state is determined.

11. A vehicle antitheft device installed in a vehicle provided with a network system combining a plurality of electronic control units through a network, the device comprising:

first means for determining a hazard state associated with a vehicle theft possibly, the hazard state including one or more of a removal of at least one of the plurality of electronic control units and an unauthorized replacement of the at least one of the plurality of electronic control units; and second means for at least partially disabling a function of the network system upon determining the hazard state, wherein at least one of the plurality of electronic control units is provided with positioning means for specifying a present vehicle position, wherein the hazard state is further determined, based on information from the positioning means, by detecting one of a difference between a first position and a second position, and a failure in specifying the second position, and wherein the first position includes a position where a power supplied to the least one of the plurality of electronic control units is stopped and the second position includes a position where the power supplied to the least one of the plurality of electronic control units is resumed.

12. A vehicle antitheft device installed in a vehicle provided with a network system combining a plurality of electronic control units through a network, the device comprising:

first means for determining a hazard state associated with a vehicle theft possibly, the hazard state including one or more of a removal of at least one of the plurality of electronic control units, an unauthorized replacement of the at least one of the plurality of electronic control units, and an unauthorized manipulation of the vehicle; and second means for at least partially disabling a function of the network system upon determining the hazard state, wherein at least one of the plurality of electronic control units is provided with an alarm device configured to generate an alarm when the hazard state is determined, and wherein the hazard state is further determined based on the alarm from the alarm device.

13. A vehicle antitheft device installed in a vehicle which is provided with a network system combining a plurality of electronic control units through a network, the device comprising:

first means for authenticating at least one of the plurality of electronic control units through a predetermined authentication process; and second means for initially at least partially disabling the network system until the predetermined authentication process is successfully completed and for returning the network system to a normal state from an at least partially disable state after the predetermined authentication process is successfully completed.

14. A vehicle antitheft device as recited in claim 13, further comprising:

fourth means for determining a hazard state, where vehicle theft possibly arises, including one of an unauthorized replacement and a removal of the at least one of the plurality of electronic control units; and fifth means for at least partially disabling the network system when the hazard state is determined after returning to the normal state by the successful completion of the predetermined authentication process.

15. A vehicle antitheft device as recited in claim 13, wherein the at least partial disabling includes interfering with a communication in the network system.

16. A program instructing a computer installed in a vehicle provided with a network system including a gateway, a plurality of local area networks, and a plurality of electronic control units, wherein the gateway mediates data communication of diverse protocols among the local area networks, and wherein each of the local area networks is connected with at least one of the plurality of electronic control units the program comprising:

determining a hazard state, where vehicle theft possibly arises, including unauthorized replacement or removal of at least one electronic control unit; and at least partially disabling the network system upon determining the hazard state.

17. A program instructing a computer installed in a vehicle provided with a network system combining a plurality of electronic control units through a network, the program comprising:

initially at least partially disabling the network system;

authenticating at least one of the plurality of electronic control units through a predetermined authenticiation process; and returning the network system from an at least partially disabled state to a normal state after the authentication is successfully completed.

18. A program instructing a computer as recited in claim 17, wherein the network system is at least partially disabled by interfering with a communication in the network system.

19. A vehicle antitheft system installed in a vehicle, the system comprising;

a gateway;

a network coupled to the gateway and a plurality of local area networks, the gateway configured to mediate data communication according to a diversity of protocols between the local area networks; and a plurality of electronic control units wherein each of the plurality of local area networks is connected with at least one of the plurality of electronic control units;

wherein the gateway includes:

first means for determining a hazard state, where vehicle theft possibly arises, including one of an unauthorized replacement and a removal of at least one electronic control unit; and second means for at least partially disabling the network system by interfering with the data communication upon determining the hazard state.

20. A vehicle antitheft device capable of being installed in a vehicle, the vehicle antitheft device having a network including a gateway, a plurality of local area networks, and a plurality of electronic control units, the gateway configured to mediate communication according to a diversity of protocols between the plurality of local area networks, each of the plurality of local area networks connected with at least one of the plurality of electronic control units, the vehicle antitheft device comprising:

a detector configured to determine a hazard state associated with a vehicle theft possibly, the hazard state including one or more of a removal of at least one of the plurality of electronic control units and an unauthorized replacement of the at least one of the plurality of electronic control units; and a function controller configured to prevent normal operation of the network system by interfering with the communication upon determining the hazard state, wherein the detector and the function controller are included in the gateway.

21. A vehicle antitheft system capable of being installed in a vehicle, the vehicle antitheft system comprising;

a network;

a plurality of electronic control units coupled to the network; and a vehicle antitheft device including:

a detector configured to determine a hazard state, associated with a vehicle theft possibly, the hazard state including one or more of a removal of at least one of the plurality of electronic control units and an unauthorized replacement of the at least one of the plurality of electronic control units; and a function controller configured to interfere with normal operation of the network upon determining the hazard state.

22. An article of manufacture capable of preventing theft of a vehicle having a processor and a plurality of electronic control units communicating through a network, the article of manufacture comprising:

a computer readable medium, and instructions carried on the computer readable medium, the instructions capable of being read by the processor, the instructions for causing the processor to:

determine a hazard state associated with a vehicle theft possibly, the hazard state including one or more of a removal of at least one of the plurality of electronic control units and an unauthorized replacement of the at least one of the plurality of electronic control units; and interfere with normal operation of the network upon determining the hazard state.

* * * * *